(12) United States Patent
Vora et al.

(10) Patent No.: US 12,486,026 B1
(45) Date of Patent: Dec. 2, 2025

(54) AERODYNAMIC ROTOR BLADE STRAKE

(71) Applicant: Wisk Aero LLC, Mountain View, CA (US)

(72) Inventors: Neel Vora, San Mateo, CA (US); Pranay Sinha, Sunnyvale, CA (US)

(73) Assignee: Wisk Aero LLC, Mountain View, CA (US)

( * ) Notice: Subject to any disclaimer, the term of this patent is extended or adjusted under 35 U.S.C. 154(b) by 6 days.

(21) Appl. No.: 18/535,900

(22) Filed: Dec. 11, 2023

Related U.S. Application Data

(60) Provisional application No. 63/432,183, filed on Dec. 13, 2022.

(51) Int. Cl.
*B64C 11/14* (2006.01)
*B64C 23/06* (2006.01)

(52) U.S. Cl.
CPC .............. *B64C 23/06* (2013.01); *B64C 11/14* (2013.01)

(58) Field of Classification Search
CPC ....... B64C 11/06; B64C 11/14; B64C 29/009; B64C 29/0091
See application file for complete search history.

(56) References Cited

U.S. PATENT DOCUMENTS

| 8,936,435 B2 | 1/2015 | Gupta et al. | |
| 2006/0102780 A1* | 5/2006 | Parks | B64D 33/08 244/53 B |
| 2011/0064582 A1 | 3/2011 | Romero et al. | |
| 2018/0339762 A1* | 11/2018 | Koelzer | B64C 29/0033 |
| 2019/0161167 A1* | 5/2019 | Wood | B64D 33/02 |

OTHER PUBLICATIONS

TUDelft (2015). https://delftxdownloads.tudelft.nl/aero/Week09/AE1110x-1e-slides.pdf (Year: 2015).*

* cited by examiner

*Primary Examiner* — Ashesh Dangol
(74) *Attorney, Agent, or Firm* — Kilpatrick Townsend & Stockton LLP (57) ABSTRACT

Embodiments of the invention are directed to improving efficiency on an aircraft. The aircraft can include at least one propulsion system with one or more strakes attached to a spinner and positioned adjacent to the root portion of one or more corresponding rotor blades. The strakes can be configured to align with the rotor blades when the rotor blades are set to a cruising pitch position.

20 Claims, 6 Drawing Sheets

AERODYNAMIC ROTOR BLADE STRAKE

RELATED APPLICATIONS

This application claims benefit under 35 USC § 119(e) to U.S. Provisional Patent Application No. 63/432,183 filed Dec. 13, 2022, and entitled "Aerodynamic Rotor Blade Strake," the disclosure of which is incorporated by reference herein in their entirety for all purposes.

FIELD

The described embodiments relate generally to an aircraft with vertical takeoff and landing capability. In particular, the embodiments provide an electric aircraft with one or more propulsion systems configured with rotor blade strakes configured to improve efficiency during forward flight.

BACKGROUND

Aircraft with vertical takeoff and landing capability sometimes use tilting fans to generate vertical thrust for hover, vertical takeoff, and vertical landing, and horizontal thrust for forward acceleration and forward cruising flight. The tilting fans include rotor blades with root portions that can cause undesirable drag and reduce efficiency during forward cruising flight.

Embodiments address these and other problems, individually and collectively.

SUMMARY

Described herein are examples (or embodiments) of an aircraft with at least one propulsion system with rotor blades and strakes that are configured to reduce aerodynamic drag. A strake can be provided for a corresponding rotor blade, in a position adjacent to (e.g., upstream and/or downstream of) the rotor blade. The strake can be configured to have a fixed pitch that aligns with a cruising pitch of a variable pitch rotor blade.

Embodiments provide an aircraft comprising a fuselage; a pair of wings coupled to opposite sides the fuselage; a propulsion system coupled to a first wing of the pair of wings, wherein the propulsion system comprises a spinner; a first rotor blade including a first blade portion and a first root portion; a first strake coupled to the spinner and positioned adjacent to the first root portion of the first rotor blade; a second rotor blade including a second blade portion and a second root portion; and a second strake coupled to the spinner and positioned adjacent to the second root portion of the second rotor blade.

According to further embodiments, the first strake is positioned upstream of the first root portion of the first rotor blade, and the second strake is positioned upstream of the second root portion of the second rotor blade.

According to further embodiments, the first strake is positioned downstream of the first root portion of the first rotor blade, and the second strake is positioned downstream of the second root portion of the second rotor blade.

According to further embodiments, the propulsion system further includes a third strake coupled to the spinner and positioned adjacent to and upstream of the first root portion of the first rotor blade; and a fourth strake coupled to the spinner and positioned adjacent to and upstream of the second root portion of the second rotor blade.

According to further embodiments, the first strake and the second strake each have a fixed pitch position, and the first rotor blade and the second rotor blade each are configured to move between a first pitch position and a second pitch position.

According to further embodiments, the first strake is aligned with the second pitch position of the first rotor blade, and the second strake is aligned with the second pitch position of the second rotor blade.

According to further embodiments, the first rotor blade and the second rotor blade are set to the second pitch position during forward cruising flight.

According to further embodiments, the aircraft further includes a control system configured to control the first rotor blade and the second rotor blade.

According to further embodiments, the first strake is configured to modify airflow when aligned with the first rotor blade.

According to further embodiments, the propulsion system has a tiltable orientation between a forward flight configuration and a vertical flight configuration, wherein the first rotor blade and the second rotor blade are set to the second pitch position when the propulsion system is set to the forward flight configuration and after a predefined forward velocity is reached.

According to further embodiments, the propulsion system further includes one or more cooling fins coupled to the spinner and positioned downstream from the first rotor blade, the second rotor blade, the first strake, and the second strake.

According to further embodiments, the first strake and a proximate end of the first blade portion are separated by a gap.

According to further embodiments, the aircraft further includes a flap configured to cover the gap.

According to further embodiments, the first strake includes one or more curved surfaces.

According to further embodiments, the first strake includes a surface that conforms to a shape of first root portion.

Embodiments also provide an propulsion system comprising a spinner; a plurality of rotor blades, each including a blade portion and a root portion; and a plurality of strakes, each coupled to the spinner and positioned adjacent to a respective root portion of a respective rotor blade of the plurality of rotor blades.

According to further embodiments, the plurality of strakes each have a fixed pitch position, and the plurality of rotor blades each are configured to move between a first pitch position and a second pitch position.

According to further embodiments, the plurality of strakes each are aligned with the second pitch position of the respective rotor blade.

According to further embodiments, the plurality of rotor blades are each set to the second pitch position during forward cruising flight.

According to further embodiments, the plurality of strakes each include a surface that conforms to a shape of the respective root portion.

Further details regarding embodiments of the invention can be found in the Detailed Description and the Figures.

BRIEF DESCRIPTION OF THE DRAWINGS

Various embodiments of the invention are disclosed in the following detailed description and the accompanying drawings. In the appended figures, similar components or features may have the same reference label. Further, various components of the same or similar type may be distinguished by following the reference label by a dash and a second label that distinguishes among the similar components.

DETAILED DESCRIPTION

Techniques disclosed herein relate generally to an aircraft with at least one propulsion system with rotor blades and strakes that are configured to reduce aerodynamic drag. A strake can be provided for a corresponding rotor blade, in a position adjacent to (e.g., upstream and/or downstream of) the rotor blade. The strake can be configured to have a fixed pitch that aligns with a cruising pitch of a variable pitch rotor blade.

Figures 1A, 1B:
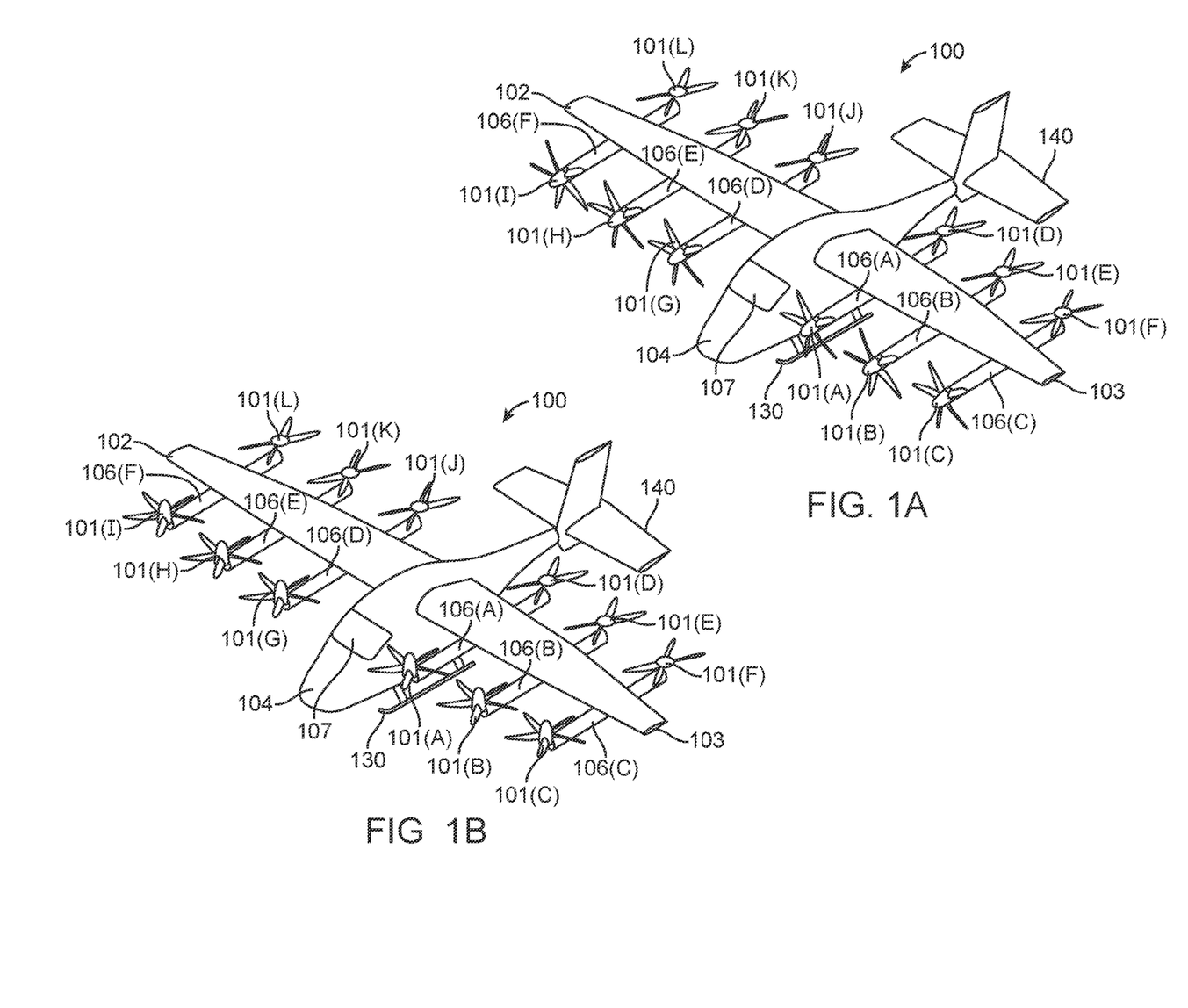
FIGS. 1A-1B depict planar views an exemplary aircraft with tilting fans in forward and vertical configurations, respectively, according to embodiments.

FIGS. 1A and 1B depict planar views of an exemplary aircraft 100, according to embodiments. The aircraft 100 can be any suitable type of flying vehicle, such as an airplane, a helicopter, a drone or a hybrid-type flying vehicle. In some embodiments, the aircraft 100 may be capable of vertical take-off and landing (VTOL). The aircraft 100 can be configured for human piloting, remote piloting, and/or autonomous flight.

In the example shown, aircraft 100 includes a fuselage 104 that may include a cabin section (e.g., toward the nose) for carrying passengers and/or cargo. A pair of wings including a first wing 102 and a second wing 103 can be mounted on or otherwise attached to the fuselage 104. The pair of wings can be coupled to opposite sides of the fuselage, and can take any suitable shape and configuration. For example, the pair of wings can be rectangular straight wings, tapered straight wings, rounded or elliptical straight wings, swept wings, delta wings, or any other suitable type of wing. In some embodiments, the first wing 102 and the second wing 103 may be coupled to the fuselage 104 in a high-wing configuration. That is, the first wing 102 and the second wing 103 may be mounted on an upper portion of the fuselage 104, as shown in FIGS. 1A-1B.

The aircraft 100 can also include support structures 106(A)-(F), which may be coupled to the wings 102, 103. As shown in FIGS. 1A-1B, each of the support structures 106(A)-(F) may take the form of a boom, though embodiments include any other suitable structure. Six support structures 106(A)-(F) are shown in FIGS. 1A-1B, where three support structures 106(A)-(F) are provided under each of the pair of wings 102, 103. The support structures 106(A)-(F) may be coupled to the undersides of the pair of wings, and may include a forward portion extending forward beyond the wing and an aft portion extending aft of the wing.

In some embodiments, each of the support structures 106(A)-(F) are identical, and therefore the support structures 106(A)-(F) may be interchangeable between the positions on the wings. For example, a first support structure 106(A) closer to the fuselage may be interchangeable with an adjacent second support structure 106(B) (e.g., the middle boom on the wing) or a further third support structure 106(C) (e.g., the boom furthest away from the fuselage).

Propulsion Systems

The aircraft 100 can also include propulsion systems 101(A)-(L). While twelve propulsion systems 101(A)-(L) are shown in FIGS. 1A-1B, any suitable number of propulsion systems 101(A)-(L) can be included. The propulsion systems 101(A)-(L) may be coupled to the pair of wings 102, 103, and may be divided equally between the wings. In some embodiments, as shown in FIGS. 1A-1B, one or more of the propulsion systems 101(A)-(L) may be mounted on the support structures 106(A)-(F). For example, pairs of propulsion systems 101(A)-(L) may be mounted on opposite ends of a respective support structure 106(A)-(F), with one propulsion system mounted forward of the wing and another propulsion system mounted aft of the wing. In other embodiments, one or more of the propulsion systems 101(A)-(L) may be coupled directly to the wings. The number of booms and/or propulsion systems may vary according to the flight needs and requirements of the aircraft 100.

According to various embodiments, each of the propulsion systems 101(A)-(L) may be configured to provide thrust to the aircraft 100. The thrust from one or more of the propulsion systems 101(A)-(L) can be used to move, control, and/or stabilize the aircraft 100. The propulsion systems 101(A)-(L) can take the form of any suitable mechanism for providing thrust. In one example, a propulsion system may include a rotor (e.g., a fan). A propulsion system can also include a drive mechanism for the rotor, such as a dedicated electric motor (e.g., in the case of electric vehicles).

A rotor may comprise any suitable number of rotor blades (e.g., 2 blades, 3 blades, 4 blades, 5 blades, 6 blades, 7 blades, or 8 blades). The rotor blades may have a predetermined pitch or a predetermined angle of attack. In some embodiments, all rotor blades may have the same pitch or the same angle of attack. In other embodiments, at least two rotor blades may have different pitches or angles of attack than each other. The rotor blades may be spaced equally or unequally. The rotor may further comprise a hub. The rotor blades may be attached to the hub. In some embodiments, the rotor blades and an integral hub may be manufactured as a single piece. The hub provides a central structure to which the rotor blades connect, and in some embodiments is made in a shape that envelops the motor.

In some embodiments the motor parts are low-profile so that the entire motor fits within the hub of the rotor, presenting lower resistance to the air flow when flying forward. The rotor can be attached to the rotating part of the motor. The stationary part of the motor can be attached to a support structure. In some embodiments the motor can be a permanent magnet motor and can be controlled by an electronic motor controller. The electronic motor controller can send electrical currents to the motor in a precise sequence to allow the rotor to turn at a desired speed or with a desired torque.

Propulsion System Orientation—Vertical and Horizontal

According to various embodiments, one or more of the propulsion systems 101(A)-(L) may be positioned, oriented, and/or otherwise configured to provide thrust and/or movement to the aircraft 100 in a predefined direction. For example, one or more of the propulsion systems 101(A)-(L) may be configured to provide thrust upward in a vertical direction. As shown in FIG. 1A, these can include propulsion systems 101(D), 101(E), 101(F), 101(J), 101(K), and/or 101(L). Propulsion systems that are configured to provide thrust in a vertical direction may also be referred to as vertical fans or lift fans, or may be referred to as propulsion systems having a lift orientation or a hover orientation. Vertical fans may be used to generate vertical thrust (e.g., lift) for taking off, landing, hovering, stabilizing, and/or controlling the aircraft 100.

A vertical direction may be defined relative to the body of the aircraft 100. For example, a vertical direction can be the aircraft's vertical axis or z-axis (e.g., the plumb line that intersects the zenith and is orthogonal to the ground when the aircraft 100 is on the ground at rest, or hovering just above the ground). In some embodiments, the vertical direction may be orthogonal to the ground when the aircraft 100 is on the ground at rest and/or in a stable hover just above the ground in a level orientation. If the aircraft 100 is tilted, the aircraft's z-axis (and the vertical direction) may no longer be orthogonal to the ground. Vertical thrust may be thrust in a vertical direction (e.g., up or down).

Vertical thrust can be achieved by installing the vertical fans and/or their corresponding support structures 106(A)-(F) so that the rotational axis of each of the vertical fans is parallel with the vertical direction and/or orthogonal to a direction of forward flight. In other words, the vertical fans may be oriented such that their rotor blades rotate within a horizontal plane (e.g., a plane that is horizontal relative to the fuselage, or a plane defined by the x-axis and y-axis of the aircraft 100) and about the vertical axis (e.g., the z-axis of the aircraft 100). In some embodiments, the vertical fans may be configured so that each set of rotor blades rotate within the same plane. In other embodiments, the vertical fans may be configured so that one or more of the sets of rotor blades rotate within different planes (e.g., parallel planes).

In other embodiments, some or all of the vertical fans are oriented at an angle, so that on an individual level, one or more vertical fans have rotor blades that do not rotate within a horizontal plane, and do not provide thrust that is completely vertical, but instead provide thrust in a direction that is angled relative to vertical. However, in combination, a set of angled vertical fans can together provide a net thrust in the vertical direction. For example, a non-vertical thrust component provided by an angled vertical fan on the first wing 102 can be counteracted by an equal and opposite non-vertical thrust component provided by an oppositely angled vertical fan on the second wing 103.

In some embodiments, two adjacent vertical fans may have their blades mounted with opposite angles of attack such that their rotor blades spin in opposite directions. Adjacent vertical fans may refer to two vertical fans (e.g., 101A and 101D) that are coupled to opposite ends of the same support structure 106(A), or two vertical fans (e.g., 101A and 101B) that are on different support structures, or two vertical fans (e.g., 101A and 101G) that are on different wings.

According to various embodiments, a first subset of vertical fans may spin in a first direction, and a second subset (e.g., remainder) of vertical fans may spin in a second direction, opposite to the first direction. Configuring the vertical fans so that some spin in a first direction and other spin in an opposite second direction can advantageously cancel out any angular momentum created by the spinning blades so that the aircraft 100 can hover in a stable manner without rotating.

Further, rotational movement about the vertical axis of the aircraft 100 (e.g., yaw) can be performed when desired by temporarily reducing the spin rotational rate of some or all a first subset of vertical fans spinning in a first direction, and/or by temporarily increasing the spin rotational rate of a second subset of the vertical fans spinning in a second direction so that the total angular momentum created by the spinning blades does not cancel out. Accordingly, the aircraft 100 can rotate with the use of vertical fans without needing another source of thrust oriented in another direction.

According to various embodiments, one or more of the propulsion systems 101(A)-(L) may be configured to provide thrust forward in a horizontal direction. As shown in FIG. 1A, these can include propulsion systems 101(A), 101(B), 101(C), 101(G), 101(H) and/or 101(I). Propulsion systems that are configured to provide thrust in a horizontal direction may also be referred to as horizontal fans or propellers, or may be referred to as propulsion systems having a forward flight orientation. Horizontal fans may be used to provide horizontal thrust for forward flight, climb, descent, and/or cruise. As shown in FIGS. 1A-1B, two propulsion systems of the same type (e.g., two vertical fans) or of different types (e.g., one vertical fan and one horizontal fan) can be mounted on each of the support structures 106(A)-(F).

A horizontal direction may be defined relative to the body of the aircraft 100. For example, a horizontal direction can be the aircraft's forward axis or x-axis. In some embodiments, the horizontal direction may be parallel to the ground when the aircraft 100 is on the ground at rest, in a stable hover just above the ground in a level orientation, and/or in a forward flight condition. If the aircraft 100 is tilted, the aircraft's x-axis (and the horizontal direction) may no longer be parallel to the ground. Horizontal thrust may be thrust in a horizontal direction (e.g., forward or backward).

Horizontal thrust (e.g., forward thrust) can be achieved by installing the horizontal fans and/or their corresponding support structures 106(A)-(F) so that the rotational axis of each of the horizontal fans is parallel with the horizontal direction and/or parallel to a direction of forward flight. In other words, the horizontal fans may be oriented such that their rotor blades rotate within a vertical plane (e.g., a plane defined by the z-axis and y-axis of the aircraft 100) and about the forward axis (e.g., the x-axis of the aircraft 100). In some embodiments, the horizontal fans may be configured so that each set of rotor blades rotate within the same plane. In other embodiments, the horizontal fans may be configured so that one or more of the sets of rotor blades rotate within different parallel planes.

In some embodiments, the horizontal fans may be configured to have the capability of spinning in either direction. As a result, the horizontal fans may be able provide a reverse thrust. A reverse thrust can be useful for moving the aircraft 100 in a backward direction (e.g., backing out of a hangar area from a hover position). Additionally, a reverse thrust can be used to reduce forward flight velocity. For example, reverse thrust from the horizontal fans can be used in instead of, or in addition to, flaps to slow the aircraft 100 and/or bring the aircraft 100 to a stationary hover.

In some embodiments, the horizontal direction and the vertical direction may be orthogonal to one another. Accordingly, vertical fans and horizontal fans may provide thrust in substantially orthogonal directions. In other embodiments, the vertical fans and horizontal fans may provide thrust that is about orthogonal or nearly orthogonal, but not exactly orthogonal. Isolating the directional thrusts into two separate types of components can beneficially simplify the control and design of the aircraft 100. In some embodiments, the horizontal fans and the vertical fans can be operated, powered on, and otherwise controlled independently from one another, thereby allowing thrust to be applied independently in the orthogonal directions (e.g., thrust can be applied in the different directions at the same time and at different times).

A combination of the horizontal fans and wings 102, 103 may achieve both forward movement and lift. In some embodiments, it may be more efficient to utilize the horizontal fans and wings 102, 103 to achieve vertical lift, instead of the vertical fans. Once the aircraft 100 reaches a sufficient speed (e.g., predetermined amount of speed, or a cruising speed) so that the wings provide sufficient lift to the aircraft 100, the vertical fans may no longer be needed to provide lift, and the vertical fans may temporarily stop operating. For example, the vertical fans may initially be active and generate vertical thrust to lift the aircraft 100. Once the aircraft 100 is off the ground and/or at a certain height, the horizontal fans can activate and/or increase the horizontal thrust so that the aircraft 100 gains horizontal velocity. The vertical fans may continue providing vertical lift while horizontal velocity increases, as the wings 102, 103 may not provide sufficient vertical lift until a predetermined speed (e.g., a cruising speed) is achieved. The vertical fans may eventually (or gradually) reduce their vertical thrust contribution as the wings 102, 103 gradually provide more (e.g., an increasing amount of) vertical lift during the increasing horizontal velocity. Later on, as the aircraft 100 slows or returns to a hover position, the vertical fans can reactivate and/or increase vertical thrust.

Propulsion System Orientation—Fixed and Tiltable

According to various embodiments, one or more of the propulsion systems 101(A)-(L) may have a fixed orientation. For example, one or more of the propulsion systems 101(A)-(L) may be mounted in a fixed orientation relative to a respective wing 102 or 103, a respective support structure 106(A)-(F), and/or the aircraft 100. While the rotor blades of a fixed propulsion system can rotate when activated, the orientation of the propulsion system housing and structure may not be rotatable with respect to the aircraft 100. As a result, a fixed propulsion system can be configured to provide thrust in a constant direction relative to the aircraft 100. The thrust direction and orientation of a fixed propulsion system relative to the aircraft 100 (e.g., the fuselage, wings, and/or support structures) may not change or move, regardless of the current aircraft 100 activities and/or direction of movement (e.g., both forward flight and vertical flight), according to embodiments.

In some embodiments, one or more vertical fans may have fixed orientations. For example, one or more of propulsion systems 101(D), 101(E), 101(F), 101(J), 101(K), and/or 101(L) may have fixed vertical orientations. These may be referred to as fixed vertical fans.

Further, according to some embodiments, one or more of the horizontal fans may have fixed orientations. For example, propulsion systems 101(A), 101(B), 101(C), 101(G), 101(H) and/or 101(I) may have fixed horizontal orientations. These may be referred to as fixed horizontal fans.

In some embodiments, all of the propulsion systems 101(A)-(L) may have fixed orientations. As a result, the vertical fans and the horizontal fans may be permanently configured to provide thrust in orthogonal (or substantially orthogonal) directions.

In other embodiments, one or more of the propulsion systems 101(A)-(L) may be configured to change orientation. For example, one or more of the propulsion systems 101(A)-(L) may be mounted in a manner that allows the orientation to be tiltable relative to a respective wing 102 or 103, a respective support structure 106(A)-(F), and/or the aircraft 100. As a result, a tilting propulsion system, which may be referred to as a tilting fan, can be configured to provide thrust in more than one direction relative to the aircraft 100. A tilting fan may be coupled to a respective support structure 106(A)-(F) via one or more tilting mechanisms including, for example, a motor and a coupling mechanism. A tilting mechanism may be controllable and/or configured to change or move the orientation and thrust direction of a tilting fan relative to the aircraft 100 (e.g., the fuselage, wings, and/or support structures) based on current aircraft 100 activities, needs, and/or direction of movement (e.g., forward flight, vertical flight), according to embodiments.

As discussed above, propulsion systems 101(A), 101(B), 101(C), 101(G), 101(H) and/or 101(I) may take the form of fixed horizontal fans. However, in other embodiments, one or more of propulsion systems 101(A), 101(B), 101(C), 101(G), 101(H) and/or 101(I) may instead take the form of tilting fans. Such tilting fans may be configured to switch (e.g., rotate or tilt) between a horizontal orientation and a vertical orientation. Horizonal orientation can also be referred to as horizontal direction or forward flight configuration. Vertical orientation can also be referred to as vertical direction or vertical flight configuration. FIG. 1A illustrates the tilting fans as currently set to a forward flight configuration. FIG. 1B illustrates the tilting fans as currently set to a vertical flight configuration.

As shown in FIG. 1B, all of the propulsion systems 101(A)-(L) may have a vertical orientation. Some of these may be vertical fans with a fixed vertical orientation (e.g., propulsion systems in the back row locations at 101(D), 101(E), 101(F), 101(J), 101(K), and/or 101(L)), while others may be tilting fans that are currently and temporarily set to have a vertical orientation or a vertical flight configuration (e.g., propulsion systems in the front row locations at 101(A), 101(B), 101(C), 101(G), 101(H) and/or 101(I)). The tilting fans may have an orientation that is the same as or similar to that of the vertical fans. FIG. 1A illustrates the tilting fans (e.g., propulsion systems in the front row locations at 101(A), 101(B), 101(C), 101(G), 101(H) and/or 101(I)) in a forward flight configuration.

Tilting fans can be controlled to switch between the forward flight configuration and the vertical flight configuration to provide additional thrust in either direction, depending on current movement needs of aircraft 100. For example, during takeoff, landing, and/or hovering, one or more tilting fans may be set to a vertical flight configuration to provide additional vertical thrust. During forward flight, forward acceleration, and/or deceleration, one or more tilting fans may be set to a forward flight configuration to provide horizontal thrust.

Embodiments allow the aircraft 100 to include any suitable combination and number of tilting fans, fixed horizontal fans, and/or fixed vertical fans. Also, each type of fan can be located at any suitable position along the wings 102, 103 and/or at any suitable support structure 106(A)-(F). The type of propulsion system at each location may be selected to enhance any number of flight characteristics including forward thrust, vertical thrust, maneuverability, drag, and/or any suitable flight characteristic.

While tilting fans can provide the ability to increase thrust in a specific direction as desired, it can be beneficial to incorporate one or more propulsion systems with fixed orientations in order to reduce weight, reduce moving parts, reduce possible failure points, and/or reduce maintenance concerns.

Propeller Blade Pitch

A rotor blade (also referred to as a propeller blade) of a propulsion system 101 can be configured to have a certain blade pitch. The blade pitch of a rotor blade refers to the angle of the blade chord line and one of a spinner of the propulsion system, the aircraft body, or a plane of rotation of the propeller. Blade pitch can be described as a ratio of forward distance per rotation, assuming no slip. Typically, a low pitch (also referred to as fine pitch) yields good low speed acceleration and climb rate in an aircraft, while high pitch (also referred to as coarse pitch) optimizes high speed performance and fuel economy.

According to embodiments, one or more rotor blades of a propulsion system 101 may have adjustable pitch settings (also referred to as variable pitch positions). Such a propulsion system may be referred to as a variable pitch propeller. In a variable pitch propeller, the blade pitch of one or more rotor blades may be adjusted during flight. The blade pitch can thus be adjusted to optimize for thrust and/or efficiency based on a phase of flight, such as takeoff, climb or cruise. For example, a fine pitch setting may be used during take-off and landing, while a coarser pitch may be used for high-speed cruise flight. An example of a low pitch used during take-off is about 15 degrees. An example of a high pitch used during cruise flight is about 40 degrees.

The amount of thrust produced by a rotor blade is dependent on the speed and the angle of attack of the rotor blade. The effective angle of attack of the rotor blade may decrease as airspeed increases. To maintain a constant effective angle of attack or otherwise optimum effective angle of attack, the blade pitch may be increased.

Any suitable mechanisms can be included to enable pitch adjustments. For example, a rotor blade may be coupled to a respective spinner via one or more pitching mechanisms including, for example, a motor and a coupling mechanism. A pitching mechanism may be controllable and/or configured to change or move the pitch position of a rotor blade relative to the spinner (or other parts of the propulsion system) based on current aircraft 100 activities, needs, and/or direction of movement (e.g., forward flight, vertical flight), according to embodiments.

As described above, one or more of the propulsion systems 101(A)-(L) may be tilting fans that can tilt between a forward flight configuration and a vertical flight orientation. The entire assembly, including a spinner and a set of rotor blades, may all tilt together. A tilting fan can be controlled to switch between the forward flight configuration and the vertical flight configuration to provide additional thrust in either direction, depending on current movement needs of aircraft 100. For example, during takeoff, landing, and/or hovering, one or more tilting fans may be set to a vertical flight configuration to provide additional vertical thrust. During forward flight, forward acceleration, and/or deceleration, one or more tilting fans may be set to a forward flight configuration to provide horizontal thrust.

Accordingly, in some embodiments, both a blade pitch of rotor blades and a tilt orientation of a tilting fan can be adjustable. Both the blade pitch and the tilt orientation may be adjusted based on the current flight stage or other movement needs of the aircraft. For example, during takeoff, one or more tilting fans can be set to have a vertical flight configuration to provide vertical lift, and one or more sets of rotor blades can be set to have a low pitch. During cruise flight, one or more tilting fans can be set to have a forward flight configuration to provide horizontal thrust, and one or more sets of rotor blades can be set to have a high pitch. There may be times when the settings are paired differently. For example, before cruising speed is reached, one or more tilting fans can be set to have a forward flight configuration to provide horizontal thrust, while one or more sets of rotor blades may be set to have a low pitch to provide optimal acceleration. Once a certain predetermined speed is reached, the low pitch can be changed to a high pitch.

Propeller Strake

A root portion of a rotor blade may be a shaft configured to connect the rotor blade to the spinner and/or internal rotor and/or motor components (e.g., a hub) within the spinner (e.g., by passing through an opening in the spinner). The root portion typically has a thick, cylindrical shape. The cylindrical structure enables a connection to the rotor. Additionally, during pitch changes, cylindrical symmetry allows the root portion to rotate within a circular gap of the spinner without changing location or otherwise requiring extra gap space.

Thick cylinders and similar geometries may not be aerodynamically optimal, and thus may cause a relatively higher amount of drag (also referred to as air resistance or wind resistance) when exposed to air currents. The root portion may have a surface which is exposed to the direction of relative air currents caused by the forward movement of the aircraft 100. Thus, drag may be produced when air flows into and across the root portion of a rotor blade. The drag may cause a portion of the aircraft 100 momentum and energy to dissipate. Additionally, the root portion may not contribute additional thrust or lift.

To compensate for drag, the aircraft 100 may provide extra forward thrust. While the aircraft 100 can compensate and maintain flight, it may involve using additional energy reserves, which thereby reduces the maximum travel range of the aircraft 100.

Additionally, certain flight parameters may lead to increased drag-to-thrust ratios, such as relatively low cruising speeds with relatively low thrust, relatively low propeller spin rates, and relatively high advance ratios. The drag may be amplified for aircraft with multiple propellers that each produce small fraction of the overall vehicle thrust, as each additional propeller causes additional drag. Certain automated multi-propeller VTOL aircraft applications may be configured to fly with these parameters. For example, the parameters for a VTOL aircraft may include a cruising speed of about 54 meters per second and a thrust power of about 350 Newtons. At these speeds and conditions, drag on the propulsion system (e.g., spinner and rotor blades) may consume about 10% of the total thrust. This is a relatively high drag-to-thrust ratio that can reduce efficiency and aircraft range.

Embodiments provide one or more strakes (also referred to as fairings or extensions) that reduce the drag caused by root portions of rotor blades and/or increase thrust, and thereby improving flight efficiency and range.

A strake may include an aerodynamic surface mounted on an aircraft to regulate airflow and improve flight characteristics and/or flight efficiency. For example, a strake may modify airflow or direct airflow over control surfaces to improve thrust and/or reduce drag. In some embodiments, a strake may act as a vortex generator. A strake may be a small blade-like structure, a fin, or have any other suitable shape and size, according to embodiments. In some embodiments, a strake may have size dimensions on the order of magnitude of inches. In some embodiments, a strake can be fixed to a spinner and positioned adjacent to the root portion of a rotor blade.

Figure 2:
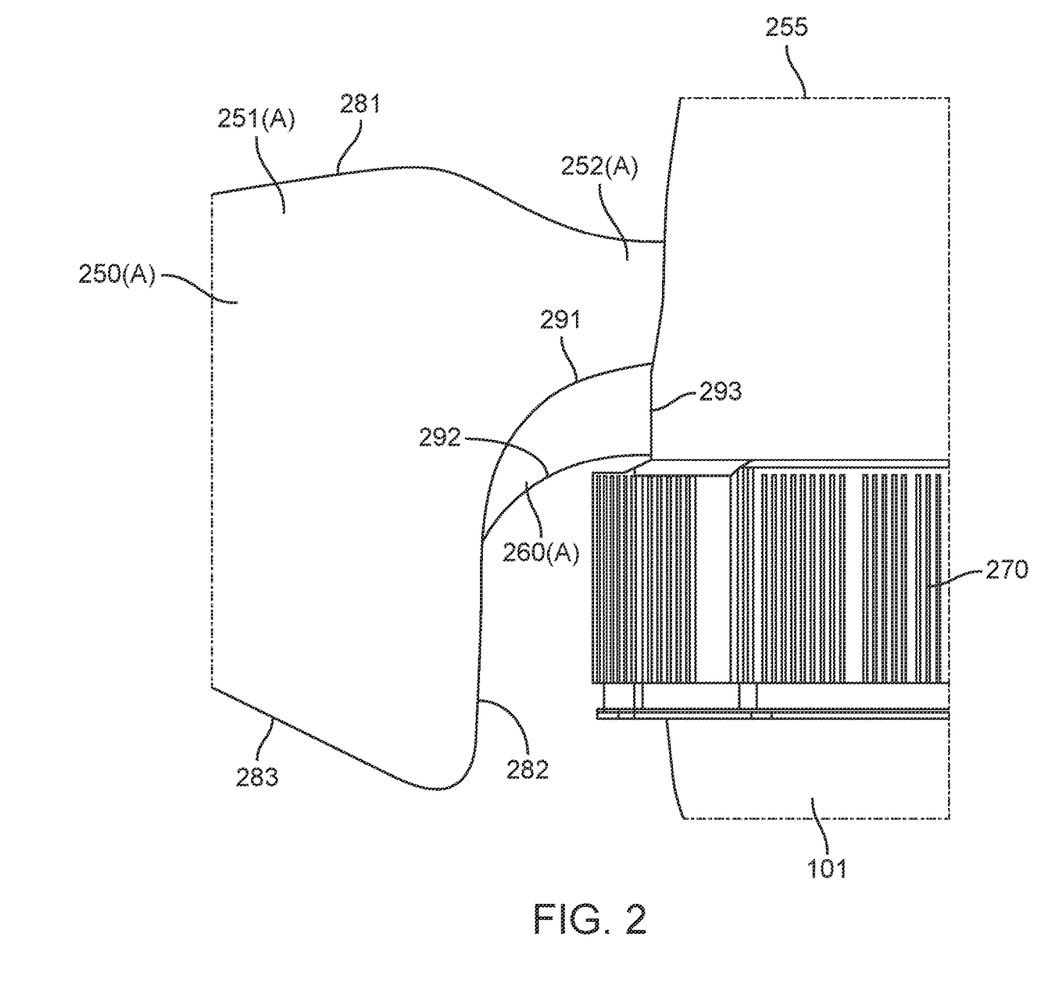
FIG. 2 depicts a propulsion system with a strake adjacent to a rotor blade, according to embodiments.

FIG. 2 illustrates an example of a propulsion system 101 configured to include a strake 260(A) adjacent to a rotor blade 250(A). As shown, the rotor blade 250(A) includes a blade portion 251(A) and a root portion 252(A). The blade portion 252 may be shaped and configured for producing lift, thrust, of otherwise modifying airflow. For example, the blade portion 251(A) may include a proximate end 282 (e.g., adjacent to the root portion, strake, and/or spinner), a distal end (not shown) opposite the proximate end 282 (e.g., a tip and/or an end furthest extended away from the root portion, strake, and/or spinner), a leading edge 281 (e.g., an end facing a front of the spinner and/or incoming airflow, the edge that leads into the flow when providing thrust), and a trailing edge 283 (e.g., the edge that retreats from the flow when providing thrust) opposite the leading edge 281. According to embodiments, the blade portion 251(A) may include any suitable curvature and/or variation in thickness or shape in any suitable areas between a proximate end 282, the distal end, the leading edge 281, and/or the trailing edge 283 of the blade portion 251(A).

The root portion 252(A) may be configured to connect the rotor blade 250(A) (e.g., the blade portion 251(A) of the rotor blade 250(A)) to the spinner 255. For example, root portion 252(A) may be a compact cylindrically-shaped structure extending between a proximate end 282 of the blade portion 251(A) and the spinner 255 or components of the motor contained within the spinner 255. The root portion 252(A) and the blade portion 252(A) may be relatively positioned to improve aerodynamics. For example, as shown, the root portion 252(A) may be coupled to the aft or upstream area of the proximate end 282 of the blade portion 251(A), instead of in a middle or downstream area of the proximate end 282 of the blade portion 251(A).

According to embodiments, the strake 260(A) may be adjacent to the rotor blade 250(A) but not directly attached to the rotor blade 250(A). Instead, the strake 260(A) may be attached or coupled to the spinner 255. The strake 260(A) may be attached to the spinner 255 with a fixed position, fixed pitch position, and/or fixed orientation, according to embodiments. The strake 260(A) can be attached to the spinner 255 after each component is fabricated, or the strake 260(A) can incorporated into a prefabricated shape of the spinner 255.

The strake 260(A) can be provided for the rotor blade 250(A) in any suitable location. As shown in FIG. 2, the strake 260(A) can be positioned adjacent to a root portion 252(A) of the rotor blade 250(A). In this example, the strake 260 is positioned downstream of (also referred to as underneath or behind) the root portion 252(A). The strake 260(A) can extend from the root portion 252(A) (e.g., which may be coupled to an aft or upstream area of the blade portion 251(A)) downstream toward a middle or downstream area of the proximate end 282 of the blade portion 251(A). Accordingly, in some embodiments, the strake 260(A) may also be positioned adjacent to a part of the surface of the blade portion 251(A). The strake 260(A) may follow the curvature of the surface of the root portion 252(A) and/or the blade portion 251(A), effectively acting as an extension of the structures of the root portion 252(A) and/or the blade portion 251(A).

According to embodiments, the strake 260(A) can be positioned close to or in contact with a corresponding root portion 252(A) and/or the blade portion 251(A). For example, to allow movement of the rotor blade 250(A), a small gap may be included between the strake 260(A) and the rotor blade 250(A). The gap may be on the order of magnitude of millimeters. For example, the gap may be 1 mm, 2 mm, 3 mm, 4 mm, 5 mm, or any other suitable distance.

In some embodiments, one or more flaps (not illustrated) may extend between the strake 260(A) and the rotor blade 250(A) to cover the gap and block airflow from entering the gap. One or more flaps can be connected to the strake 260(A) and/or the rotor blade 250(A). The flaps may include a flexible and/or shielding material.

The strake 260(A) may have any suitable shape, configuration, and structure. As shown in FIG. 2, an upstream end 291 (e.g., upstream edge, portion, and/or surface) of the strake 260(A) may conform to the shape of adjacent surfaces of the root portion 252(A) and/or the blade portion 251(A) in order minimize gaps between the strake 260(A) and the root portion 252(A) and/or the blade portion 251(A). A downstream end 292 (e.g., downstream edge, portion, and/or surface) of the strake 260(A) may include a concave curvature (e.g., designed to improve aerodynamics), a convex curvature, or may be straight, according to embodiments. A proximate end 293 (also referred to as an inner surface) of the strake 260(A), adjacent to the spinner, may attach to the spinner and/or conform to the outer surface shape of the spinner 255. Further, side surfaces of the strake 260(A) may be straight, curved, smooth, or have any other suitable aerodynamic qualities. Taken together, the various surfaces and sides of the strake 260(A) may provide a claw-like overall shape for the strake structure. Additionally, the strake 260(A) can, in some embodiments, 2-dimensional curvature, 3-dimensional curvature, and/or include flatness in any suitable surface, edge, or structural portion. In some embodiments, the strake 260(A) can be configured to continue a curvature of the rotor blade 250(A), and a composite structure of the strake 260(A) and rotor blade 250(A) can thereby include a certain predefined curvature.

Figure 4A:
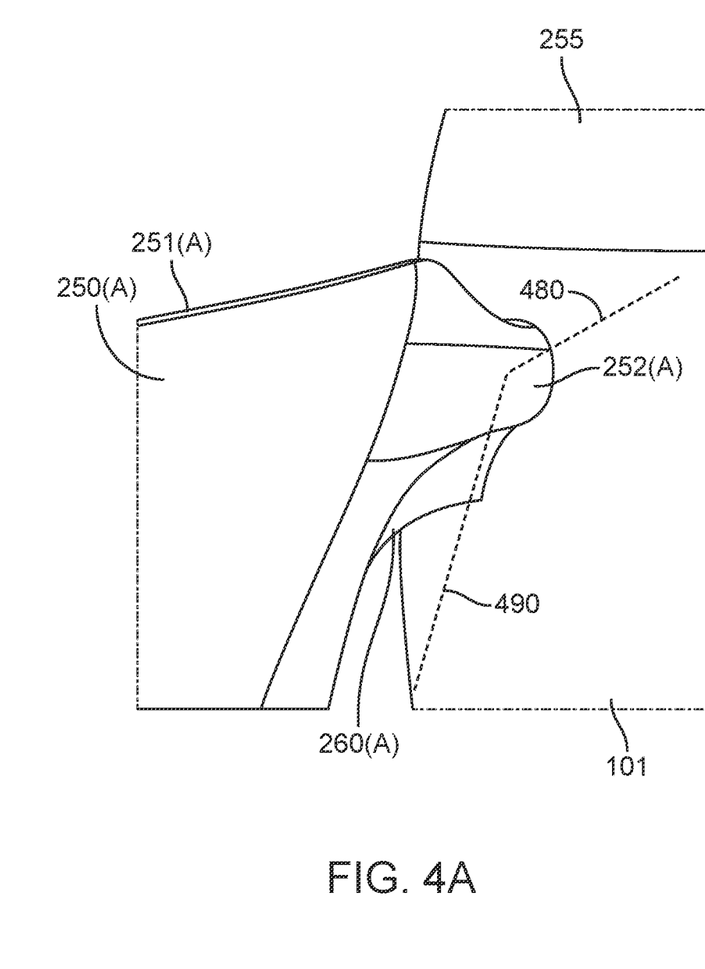
FIGS. 4A-4B illustrate two different rotor blade pitch positions, according to various embodiments.
Figure 4B:
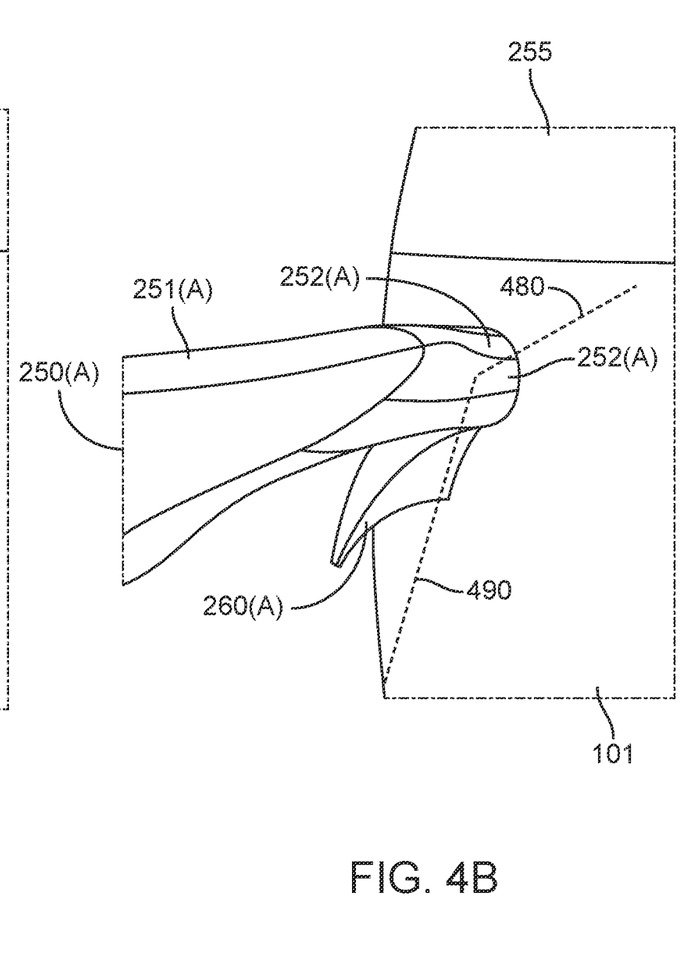

According to embodiments, the end of the strake 260(A) may be thinner than the root portion 252(A) or may have a thickness similar to the root portion 252(A). Further, the thickness of the strake 260(A) may taper, such that all or a portion of the upstream end 291 of the strake 260(A) (e.g., adjacent to the root portion 252(A)) may be thicker, while a downstream end 292 portion of the strake 260(A) (e.g., adjacent to the air) may be thinner. Such a tapering thickness is illustrated in FIG. 4B.

Embodiments allow the strake 260(A) to have any suitable size. The size of the strake 260(A) may be based upon the size of the rotor blade 250(A). In some embodiments, the strake 260(A) may have size dimensions (e.g., length and height) on the order or inches (e.g., 1 inch, 1.5 inches, 2 inches, 3 inches, 5 inches, 10 inches, 20 inches, etc.).

The strake 260(A) may effectively modify the geometry of the rotor blade 250(A). The addition of the strake 260(A) may convert the root portion 252(A) from a non-aerodynamic shape (e.g., a cylindrical shaft) to an aerodynamic shape (e.g., a fairing). As a result, most or all of the rotor blade 250(A) surfaces can be aerodynamic surfaces, and/or the aerodynamic surfaces can extend from a tip of the rotor blade 250(A) all the way to the spinner 255, while still maintaining a cylindrical root connection through the circular (or ovular) opening in the spinner 255 to the internal motor components, according to embodiments.

With the strake 260(A) added, the rotor blade 250(A) can be modified to have an elongated chord with an increased Reynolds number, improved airflow characteristics, and produce less drag. Additionally, in some embodiments, the strake 260(A) may provide additional thrust to the aircraft 100.

Additionally, according to embodiments, the strake 260(A) may direct and improve airflow over one or more cooling fins 270, improving the effectiveness of the cooling fins 270. Internal components within the propulsion system 101 may produce heat during operation. The cooling fins 270 can be included on an outer surface of the spinner 255 that connect to the internal components, so that internal heat can be dispersed. For example, a set of cooling fins 270 may fully or partially encircle the spinner 255. Any suitable number of cooling fins 270 can be included (e.g., 10, 50, 100, 200, 500, 700, or 1000 cooling fins). The cooling fins 270 can be strategically positioned downstream of or more rotor blades and/or strakes such to improve airflow and cooling functionality of the cooling fins 270.

FIG. 2 illustrates a close-up view of a single rotor blade 250(A) and strake 260(A) coupled to a spinner 255 of a propulsion system 101. While not shown in FIG. 2, the propulsion system 101 can be configured to include any suitable number of rotor blades, according to embodiments. For example, FIG. 3C illustrates the propulsion system 101 including five rotor blades 250(A)-(E). According to embodiments, one or more (e.g., all or a subset) of the plurality of rotor blades 250(A)-(E) can include a corresponding strake.

Figure 3A:
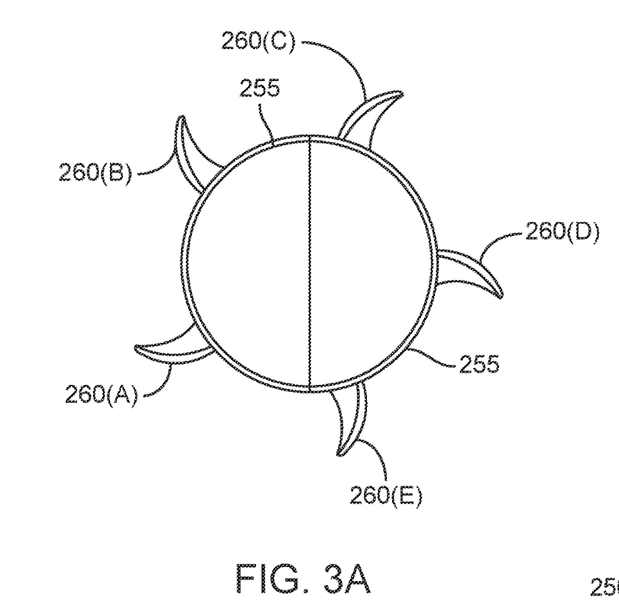
FIGS. 3A-3C illustrate a propulsion system with multiple strakes for multiple rotor blades, according to embodiments.
Figure 3B:
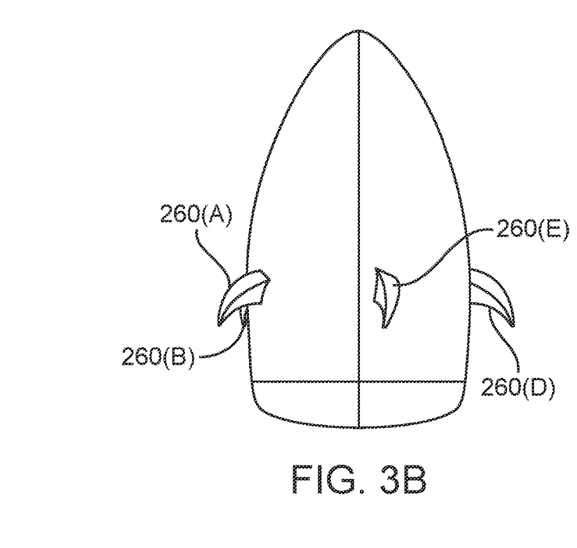
Figure 3C:
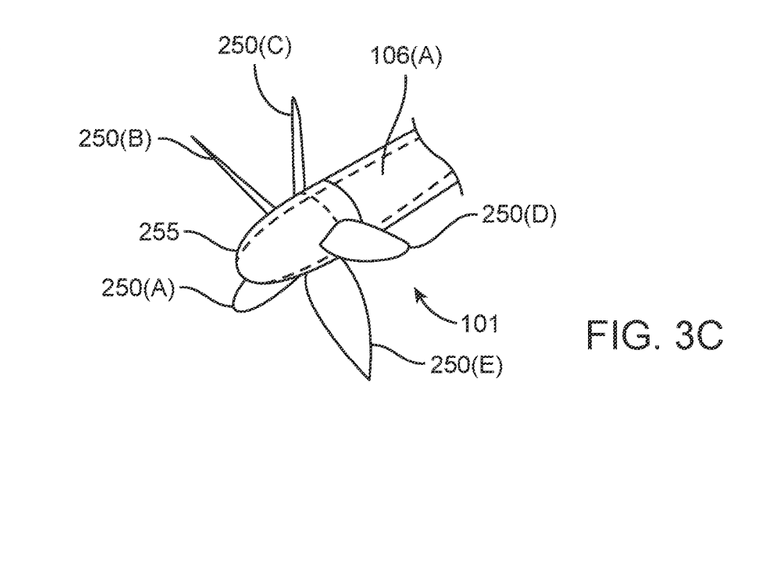

FIGS. 3A-3B illustrate a top-view and a side-view, respectively, of a spinner 255 configured to include five strakes 260(A)-(E). Each of these strakes can be positioned adjacent to a respective rotor blade of the five rotor blades 250(A)-(E). For illustrative purposes, the rotor blades 250(A)-(E) are not shown in FIGS. 3A-3B, and the strakes 260(A)-(E) are not shown in FIG. 3C. However, embodiments allow the rotor blades 250(A)-(E) and the strakes 260(A)-(E) to be included on the same propulsion system.

As discussed above, one or more of the rotor blades 250(A)-(E) may have variable pitch positions. For example, rotor blade 250(A) may be configured to rotate through a predefined range of pitch positions, which can include a first pitch position 480 as illustrated in FIG. 4A, and a second pitch position 490 as illustrated in FIG. 4B.

The first pitch position 480 may be used during a first stage of flight, such as vertical takeoff, landing, hover, forward acceleration, etc. (e.g., when the aircraft is in the vertical flight configuration). The first pitch position 480 may be referred to as hover pitch or acceleration pitch. The first pitch position 480 can be any pitch that is suitable for hover flight, takeoff, and/or acceleration. As an example, the first pitch position 480 can be any suitable pitch between about 15 degrees and about 25 degrees (e.g., 15 degrees, 18 degrees, 20 degrees, 23 degrees, 25 degrees).

The second pitch position 490 (e.g., 40 degrees) may be used during a second stage of flight, such as cruising flight (e.g., when the aircraft is in the forward flight configuration). This second pitch position 490 may be referred to as cruise pitch. The second pitch position 490 can be any pitch that is suitable for cruising forward flight. As an example, the second pitch position 490 can be any suitable pitch between about 30 degrees and about 50 degrees (e.g., 30 degrees, 35 degrees, 40 degrees, 45 degrees, 50 degrees).

In some embodiments, the first pitch position 480 may be a minimum pitch, and the second pitch position 490 may be a maximum pitch of an exemplary rotor blade 250(A), with other pitch positions existing between the first pitch position 480 and the second pitch position 490. In other embodiments, the rotor blade 250(A) may be able to reach pitches lower than the first pitch position 480 and pitches higher than the second pitch position 490.

Due to variation in rotor blade pitch position, a fixed (e.g., non-pitching) strake 260(A) that has a fixed pitch position may not always be aligned with and/or positioned directly underneath the rotor blade 250(A). For example, the rotor blade 250(A) has the same pitch position as the strake 260(A) and is aligned with the strake 260(A) in FIG. 4A, while the rotor blade 250(A) has a different pitch position than the strake 260(A) and is not aligned with the strake 260(A) in FIG. 4B.

In some embodiments, the strake 260(A) can be configured to have a strake pitch that is aligned with a certain predefined pitch position of the rotor blade 250(A). For example, as shown in FIGS. 4A-4B, the strake 260(A) may be fixedly set to and/or aligned with the second pitch position 490 (e.g., cruise pitch). As a result, the strake 260(A) may be configured to provide the aerodynamic improvements to the rotor blade 250(A) when the rotor blade 250(A) is set to the second pitch position 490 as shown in FIG. 4A. However, the strake 260(A) may be configured to provide less or none of the aerodynamic improvements to the rotor blade 250(A) when the rotor blade 250(A) is in the first pitch position 480, as shown in FIG. 4B, and/or other pitch positions besides the second pitch position 490.

According to embodiments, may be preferable to configure the strake 260(A) to be aligned with the second pitch position 490, as the second pitch position 490 may typically be utilized when the aircraft 100 is moving at higher airspeeds during forward cruising flight. Thus, the strake 260(A) can be configured to provide aerodynamic improvements, increase thrust, and/or reduce drag when the aircraft 100 is moving at higher speeds and therefore experiencing higher amounts of drag. Additionally, a greater amount of time may be spent in forward cruising flight than in takeoff, hover, and/or landing. Thus, the strake 260(A) may be aligned with the rotor blade 250(A) for a greater amount of flight time when it is set to the second pitch position 490.

In other words, efficiency during cruising flight may be prioritized over efficiency during hover, takeoff, and/or landing. Aircraft speeds are typically low during hover, takeoff, and/or landing, so little to no drag is experienced across the entire aircraft. Accordingly, the blade root 252(A) may cause little to no drag even during these stages of flight, so flight efficiency may remain unaffected even if the strake 260(A) is not aligned.

In some embodiments, different propulsion systems can be configured to have differently pitched strakes 260(A). For example, one or more vertical fans may include strakes 260(A) that are aligned with the first pitch position 480 (e.g., hover pitch) instead of the second pitch position 490, while one or more horizontal fans and/or tilting fans may be aligned with the second pitch position 490.

The strakes 260(A)-(E) as discussed above can reduce drag on the root portion by a significant amount, improving the propeller efficiency, reducing overall vehicle drag, and thus vehicle range. For certain aviation applications and/or regulations, a 2% increase in travel range is equivalent to approximately 20% of power reserves. As a result, the drag reductions and range increases are meaningful from a mission planning perspective. In certain embodiments the strakes 260(A)-(E) can provide a 5%-6% improvement in cruise efficiency over a traditional propeller design, which equates to about 5%-6% improvement in range. In another embodiment, a 2% increase in cruise efficiency can be realized while also allowing for a thicker, faired-blade root section, which can also make the structural design more robust to static and vibratory loads.

Figure 5A:
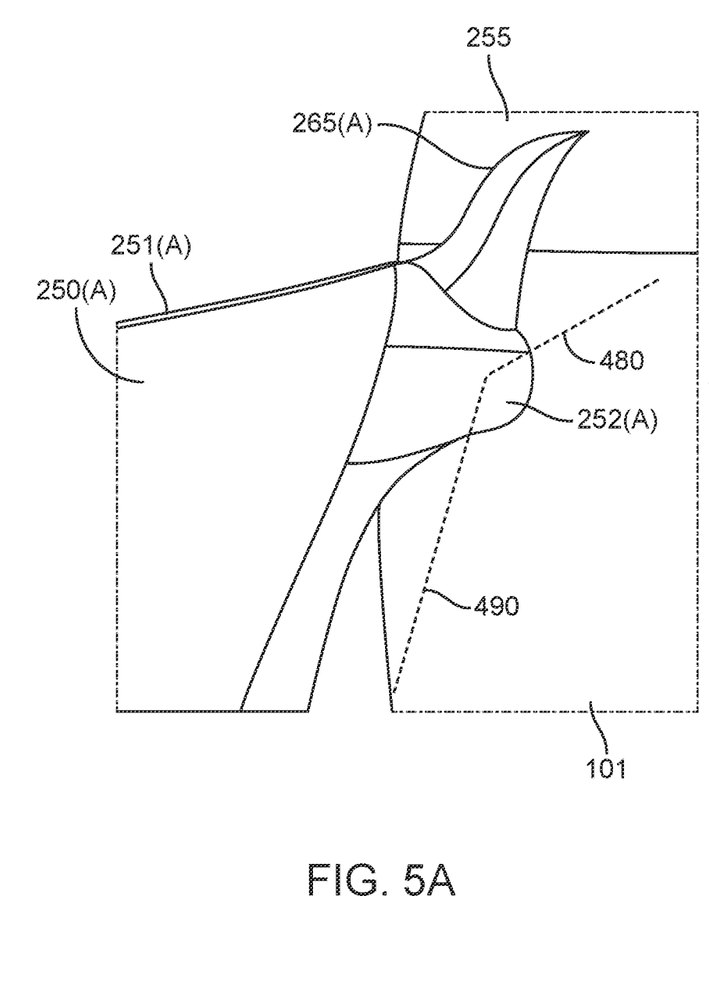
FIGS. 5A-5B illustrate a propulsion system with a strake positioned upstream of a rotor blade, according to embodiments.
Figure 5B:
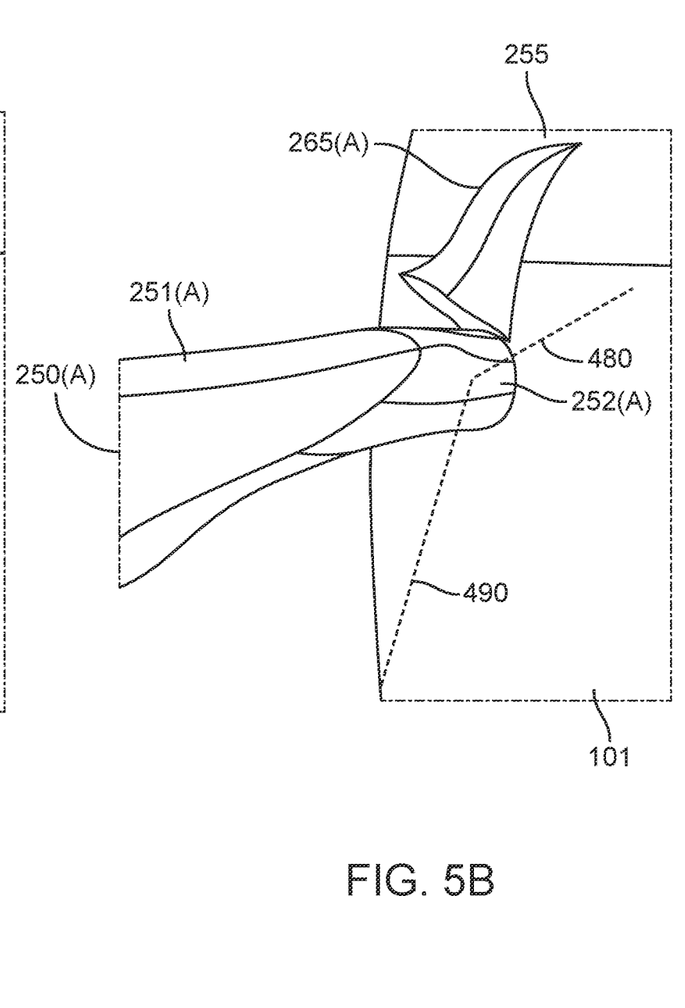

According to various embodiments, one or more strakes may be positioned at additional and/or alternative locations. For example, FIGS. 5A-5B illustrate a strake 265(A) positioned upstream of (also referred to as aft, above, or in front of) the root portion 252(A), according to embodiments. The strake 265(A) may be able to provide similar aerodynamic properties and improvements to efficiency by effectively modifying the shape of the leading edge of the root portion 252(A).

Similar to the strake 260(A) discussed above with the respect to FIG. 2, the strake 265(A) may be adjacent to the rotor blade 250(A) but not directly attached to the rotor blade 250(A). Instead, the strake 265(A) may be attached or coupled to the spinner 255. The strake 265(A) may be attached to the spinner 255 with a fixed position, fixed pitch, and/or fixed orientation, according to embodiments.

According to embodiments, the strake 265(A) can be positioned close to or in contact with a corresponding root portion 252(A) and/or the blade portion 251(A). For example, to allow movement of the rotor blade 250(A), a small gap may be included between the strake 265(A) and the rotor blade 250(A). The gap may be on the order of magnitude of millimeters. For example, the gap may be 1 mm, 2 mm, 3 mm, 4 mm, 5 mm, or any other suitable distance.

In some embodiments, one or more flaps (not illustrated) may extend between the strake 265(A) and the rotor blade 250(A) to cover the gap and block airflow from entering the gap. One or more flaps can be connected to the strake 265(A) and/or the rotor blade 250(A). The flaps may include a flexible and/or shielding material.

The strake 265(A) may have any suitable shape, configuration, and structure. As shown in FIGS. 5A-5B, a downstream end of the strake 265(A) may conform to the shape of adjacent surfaces of the root portion 252(A) and/or the blade portion 251(A) in order minimize gaps between the strake 265(A) and the root portion 252(A) and/or the blade portion 251(A). An upstream end of the strake 265(A) may include a concave curvature (e.g., designed to improve aerodynamics), a convex curvature, a combination of curves, and/or may be straight, according to embodiments. An inner surface of the strake 265(A), adjacent to the spinner, may attach to the spinner and/or conform to the outer surface shape of the spinner 255. Further, side surfaces of the strake 265(A) may be straight, curved, smooth, or have any other suitable aerodynamic qualities.

According to embodiments, the downstream portion of the strake 265(A) may be thinner than the root portion 252(A) or may have a thickness similar to the root portion 252(A). Further, the thickness of the strake 265(A) may taper, such that the downstream end of the strake 265(A) (e.g., adjacent to the root portion 252(A)) may be thicker and an upstream portion of the strake 265(A) (e.g., adjacent to the air) may be thinner.

Embodiments allow the strake 265(A) to have any suitable size. The size of the strake 265(A) may be based upon the size of the rotor blade 250(A). In some embodiments, the strake 265(A) may have size dimensions (e.g., length and height) on the order or inches (e.g., 1 inch, 1.5 inches, 2 inches, 3 inches, 5 inches, 10 inches, 20 inches, etc.).

Similar to the strake 265(A) illustrated in FIGS. 4A-4B, the strake 265(A) in FIGS. 5A-5B can have a fixed position and a fixed pitch. The strake 265(A) can be configured to have a strake pitch that is aligned with a certain predefined rotor blade pitch position. For example, as shown in FIGS. 5A-5B, the strake 265(A) may be fixedly set to and/or aligned with the second pitch position 490 (e.g., cruise pitch). As a result, the strake 265(A) may be configured to provide the aerodynamic improvements to the rotor blade 250(A) when the rotor blade 250(A) is set to the second pitch position 490 as shown in FIG. 5A. However, the strake 265(A) may be configured to provide less or none of the aerodynamic improvements to the rotor blade 250(A) when the rotor blade 250(A) is in the first pitch position 480, as shown in FIG. 5B, and/or other pitch positions besides the second pitch position 490.

Figure 6:
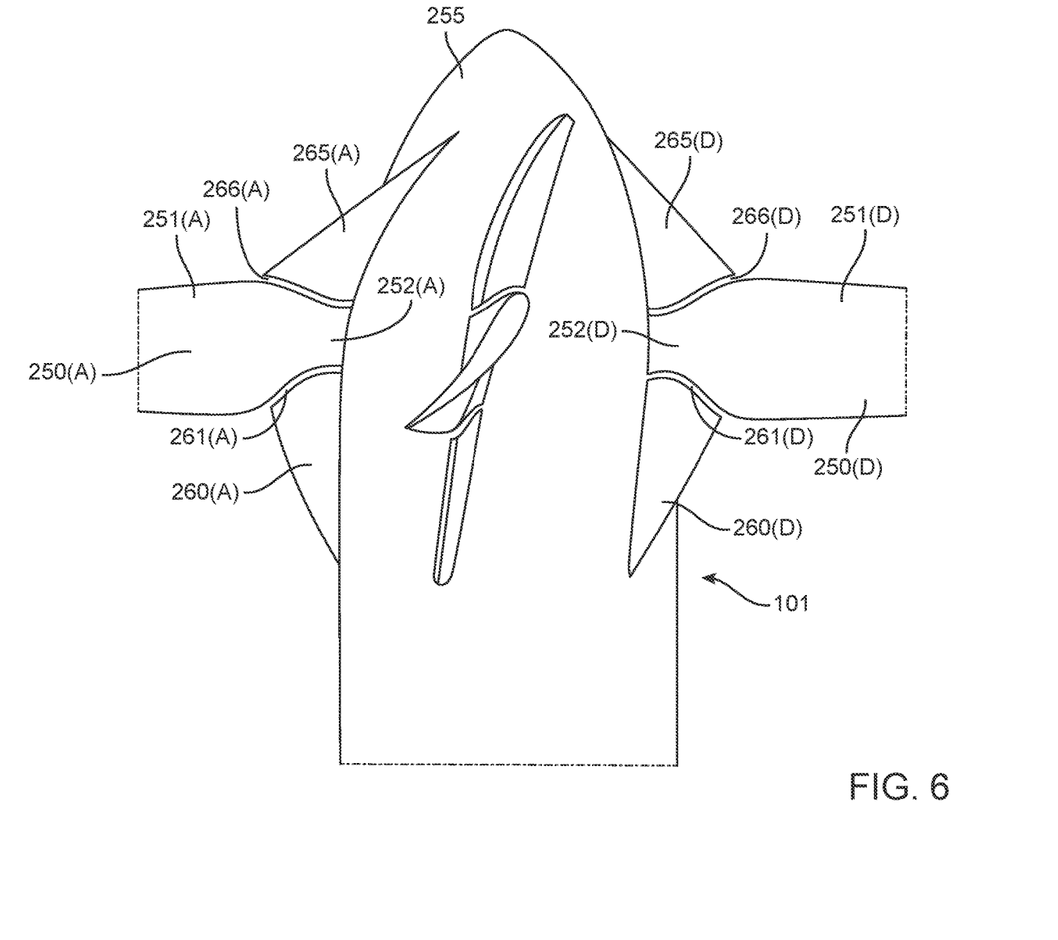
FIG. 6 illustrates a propulsion system with strakes positioned both upstream of and downstream of each rotor blade, according to embodiments.

According to embodiments, a single rotor blade can include multiple strakes. For example, FIG. 6 illustrates a propulsion system 101 configured to include two strakes for each rotor blade. Each rotor blade (e.g., 250(A) and 250(D)) is provided with a corresponding downstream strake (e.g., 260(A) and 260(D)) similar to FIGS. 4A-4B as well as a corresponding upstream strake (e.g., 265(A) and 265(D)) similar to FIGS. 5A-5B. Also illustrated here are the first gap 261(A) between the downstream strake 260(A) and the first rotor blade 250(A), the second gap 266(A) between the upstream strake 265(A) and the first rotor blade 250(A), the first gap 261(D) between the downstream strake 260(D) and the second rotor blade 250(D), and the second gap 266(D) between the upstream strake 265(D) and the second rotor blade 250(D). While the exemplary embodiment illustrated in FIG. 6 includes gaps 261(A), 261(D), 266(A), 266(D) between strakes and corresponding rotor blades, in some embodiments, one or more strakes may be in physical contact with the corresponding rotor blades (e.g., no gap is provided between the rotor blade and the strake(s)).

A chord is the distance between the leading and trailing edge of a propeller blade (which may be measured parallel to the normal airflow over the blade). In FIG. 6, the chord of the rotor blade 250(A) chord can include the widths of a root portion 252(A), the upstream strake 265(A), and the downstream strake 260(A). Accordingly, including two strakes allows the chord of the rotor blade 250(A) to be increased. The elongated chord can further improve the Reynolds number at the root, improve thrust, reduce drag, and otherwise improve efficiency during cruise flight.

As shown and discussed with respect to FIGS. 2-6, the strake may be attached to the spinner, and, in some exemplary embodiments, a small gap may be present between the strake and the rotor blade to allow the rotor blade to rotate during pitch changes. Alternatively, in some embodiments, the strake may instead be attached to the rotor blade, and a gap may be included between the strake and the spinner such that the strake is not in direct contact with the spinner. Such a strake can be attached to the rotor blade after being fabricated, or may incorporated into a prefabricated shape of the rotor blade.

Attaching the strake to the rotor blade can allow the strake to always maintain pitch alignment with the rotor blade. However, due to the 3-dimensional curvature of the spinner surface and the rotor blade and/or strake, the gap between the strake and the spinner may need to be large enough to allow the rotor blade and strake to rotate during pitch changes without contacting the spinner. This gap may be larger than the small gap between the strake and rotor blade in embodiments where the strake is attached to the spinner. For example, a sufficient gap between the strake and the spinner may be on the order of centimeters (e.g., ½ centimeter, ¾ centimeter, 1 centimeter, 2 centimeters) instead of millimeters. The relatively larger gap may lead to increased undesired airflow effects, cause increased drag, cause decreased thrust, and/or otherwise reduce efficiency in comparison with a smaller gap.

Control System

Referring back to FIGS. 1A-1B, according to various embodiments, the aircraft 100 may be an electrically powered aircraft or a hybrid-electric aircraft. One or more battery units may be included in the aircraft 100 (e.g., within the fuselage 104) and configured to provide power to various aircraft components, such as one or more electric motors and/or on-board computer systems. The propulsion systems 101(A)-(L) may be driven by electric motors that are powered by an electric power system including the one or more battery units. In some embodiments, each of the propulsion systems propulsion systems 101(A)-(L) may be coupled to a dedicated battery unit. Alternatively, there may be a one-to-many relationship between the one or more battery units and the propulsion systems 101(A)-(L). In some cases, one or more battery units may be the sole power source for the aircraft 100. Each battery unit may include one or more battery cells.

According to various embodiments, the aircraft 100 may include a control system 107, such as a flight control system, which is configured to control the aircraft 100. The control system 107 may be configurable to control the aircraft 100 automatically and/or remotely (e.g., via a control signal received from a remote entity, such as a remote controller, a remote pilot or a remote-control tower). In various embodiments, the control system 107 can include one or more computers with one or more non-transitory computer readable medium storing instructions, and one or more processors configured to execute the instructions in order to perform the processing and control functions described herein.

For example, the control system 107 may control when the propulsion systems 101(A)-(L) should be operated, and/or the amount of power provided to the propulsion systems 101(A)-(L). The control system 107 may be configurable to control the propulsion systems 101(A)-(L) independently from one another. According to various embodiments, the control system 107 may control the propulsion systems 101(A)-(L) based on input received from a remote controller (e.g. remote pilot), input received from an autopilot, sensor data and/or flight data received from the sensors (e.g. sensors measuring air temperature, electric motor temperature, airspeed of the aircraft, etc.), computers, and other input/output devices coupled to the aircraft.

The flight control system 107 may also control one or more tilting mechanisms to switch the positioning of one or more tilting fans from the forward flight configuration to the vertical flight configuration, as well as from the vertical flight configuration to the forward flight configuration. According to various embodiments, the control system (e.g., flight control system) may control the tilting fans between the two positions based on sensor data and/or flight data received from the sensors (e.g., sensor measuring air temperature, electric motor temperature, airspeed of the aircraft, etc.), computers, and other input/output devices coupled to the aircraft.

The flight control system 107 may further control one or more pitching mechanisms to switch the positioning of one or more rotor blades between two or more pitch positions. According to various embodiments, the flight control system 107 may control the rotor blade pitch positions based on sensor data and/or flight data received from the sensors (e.g., sensor measuring air temperature, electric motor temperature, airspeed of the aircraft, etc.), computers, and other input/output devices coupled to the aircraft. The pitch of a rotor blade may be set based upon current flight stage and/or flight needs. For example, a first pitch, which may be a low pitch, may be chosen during times when the aircraft is accelerating (e.g., forward, or upward), hovering, taking off, and/or landing. When the control system moves a rotor blade to the first pitch, the rotor blade may not be aligned with an adjacent strake, according to embodiments. A second pitch, which may be a high pitch, may be selected when the aircraft has reached cruise flight (e.g., having reached a predefined forward velocity). When the control system moves the rotor blade to the second pitch, the rotor blade may become aligned with the adjacent strake, according to embodiments.

Accordingly, the control system 107 may be configured to translate pilot or other operator input, and/or corrections computed by an onboard computer, into forces and moments and/or to further translate such forces and moments into a set of actuator (e.g., vertical lift rotors; propellers; control surfaces, such as ailerons; etc.) and/or associated parameters (e.g., lift fan power, pitch, speed, or torque) to provide the required forces and moments. For example, pilot or other operator inputs may indicate a desired change in the aircraft's speed, direction, and/or orientation, and/or wind or other forces may act on the aircraft, requiring the propulsion systems and/or other actuators to be used to maintain a desired aircraft attitude (roll/pitch/yaw), speed, and/or altitude.

According to various embodiments, the control system 107 may be configurable to receive a flight instruction, such as a takeoff, hover, cruise or landing instruction. The control system 107 may then determine the current location and/or velocity of the aircraft 100, and then control the operation of the propulsion systems 101(A)-(L) based on the flight instruction. During the operation of the aircraft 100, the control system 107 may be configurable to continuously monitor the operational states of the propulsion systems 101(A)-(L) in view of the flight instruction.

The aircraft 100 can further include landing gear 130. The landing gear 130 can include any suitable combination of one or more skids, wheels, skis, pontoons, shock absorbers, struts, and/or any other suitable component for supporting the aircraft 100 when landing and/or landed on the ground. In some embodiments, the landing gear 130 can be retractable into a compartment within the fuselage 104.

The aircraft 100 can include any other suitable control structures and control surfaces. Any suitable number of ailerons, rudders, elevators, slats, flaps, spoilers, and/or stabilizers can be included. For example, a horizontal stabilizer 140 (e.g., a tailplane) can be coupled to a rear end or tail of the fuselage 104. The horizontal stabilizer 140 may be in any suitable shape or form. For example, as shown in FIGS. 1A-1B, the horizontal stabilizer 140 may include two stabilizer surfaces protruding at horizontally from a tail. In some embodiments, each of the stabilizer surfaces can further include hinged control surfaces on the aft edges. Additionally, as shown in FIGS. 1A-1B, an additional (e.g., third) vertical stabilizer surface can be mounted on the tail, extending vertically upward and/or downward. Introducing the horizontal stabilizer 140 can provide additional stability and control of the aircraft 100. This can be especially useful during times when the vertical fans are disabled or otherwise not being utilized or relied on for control and stability (e.g., during cruising flight).

Flight Process

According to various embodiments, a control system may control flight of an aircraft configured for vertical takeoff and landing.

An aircraft may be in a stationary position on the ground. For example, the aircraft may be parked at a charging station for charging the batteries. Alternatively, the aircraft may be parked at a location awaiting to receive cargo or passengers. A flight control system of the aircraft may receive a flight plan (e.g., from the autopilot, a pilot or a remote controller pilot) to arrive at a predetermined destination. The flight plan may include an instruction to takeoff from the ground. The flight control system may control one or more of the propulsion systems to activate. For example, the thrust-producing components of the aircraft may be deactivated or in a standby mode. The flight control system may power up the propulsion systems from a deactivated mode so that they are ready to generate vertical lift.

The control system may operate a first set of one or more propulsion systems coupled to the aircraft. Each of the first set of one or more propulsion systems may have two or more rotor blades and a fixed vertical orientation or a tiltable orientation currently set to a vertical flight configuration.

For example, the flight control system may initiate a takeoff sequence to lift the aircraft off of the ground. The flight control system may operate the first set of one or more propulsion systems to provide vertical thrust so that the aircraft leaves the ground. The flight control system may continue operating the first set of one or more propulsion systems in this manner until a certain time has passed or a certain height is reached (e.g., a safe distance from a landing pad). The control system can continue to operate the first set of one or more propulsion systems during liftoff, hovering, landing, or any other suitable stage of flight to provide vertical thrust.

The control system may at some points control one or more of the first set of one or more propulsion systems, such as fixed vertical fans, to stop operating during other stages of flight, such as forward cruising flight when vertical lift may additionally and/or instead be provided by wings of the aircraft. For example, after a certain amount of time has passed and/or altitude gained, the flight control system may receive an instruction to transition to forward flight. Before switching to the forward flight mode, the control system may check one or more of the altitude, speed and orientation of the aircraft to ensure that the parameters are within a predetermined, desirable range. In some embodiments, the control system may communicate the parameters to a remote entity (e.g., a remote-control tower or a remote pilot).

The control system may operate a second set of one or more propulsion systems. Each of the second set of one or more propulsion systems have a fixed horizontal orientation or a tiltable orientation set to a forward flight configuration. Each of the second set of one or more propulsion systems may have two or more rotor blades. In some embodiments, one or more propulsion systems, such as tilting fans, may be included in both the first set of one or more propulsion systems and the second set of one or more propulsion systems.

For example, upon receiving the flight instruction to transition to forward flight, the control system may operate a second set of one or more propulsion systems to generate forward thrust for the aircraft. The flight control system can control the forward acceleration in any suitable manner, such as by may gradually increasing the power supplied to the second set of one or more propulsion systems so that the aircraft gradually gains forward velocity.

In some embodiments, the second set of one or more propulsion systems may activate and begin providing forward thrust while the aircraft is still in the process of gaining altitude from the vertical lift fans. As a result, forward travel can overlap with vertical lifting. Additionally, the flight control system can adjust power to the first set of one or more propulsion systems as required to maintain stability and altitude while the second set of one or more propulsion systems causes forward airspeed to increase.

In some embodiments, one or more of the second set of one or more propulsion systems may be operated to tilt between a forward flight configuration and a vertical flight configuration. Such tilting propulsion systems may be operated during both one or more steps to provide vertical thrust and one or more steps to provide horizontal thrust.

The control system may set and/or modify a pitch position setting of one or more rotor blades of one or more propulsion systems (e.g., from the first set and/or the second set). In some embodiments, one or more rotor blades may be initially set to a first pitch position. The first pitch position can be maintained during one or more stages of flight, such as takeoff and/or forward acceleration. The control system may then adjust the one or more rotor blades to have a second pitch position. For example, once cruising flight is reached (e.g., after reaching a certain forward speed), the pitch setting can be changed to the second pitch position. In some embodiments, the pitch setting can be gradually and/or iteratively changed from the first pitch position to the second pitch position as forward velocity increases, and can be gradually changed from the second position to the first position as forward velocity decreases.

In some embodiments, rotor blades of a tilting propulsion system may be set to the first pitch position when the tilting propulsion system is in a vertical flight configuration. When the tilting propulsion system is tilted into a forward flight configuration, the first pitch position can be maintained for a period of time during forward acceleration. Later, once a certain amount of forward velocity is gained, the rotor blades can be set to the second pitch position.

The control system can continue to operate the second set of one or more propulsion systems during forward cruising flight, forward acceleration, deceleration, or any other suitable stage of flight to provide horizontal thrust. The control system may at some points control the first set of one or more propulsion systems to stop operating during other stages of flight, such as liftoff, hovering, and/or landing. At some points in time, the control system can operate both the first set of one or more propulsion systems and the second set of one or more propulsion systems simultaneously.

Subsequently, the flight control system may deactivate one or more of the first set of one or more propulsion systems, or otherwise reduce power provided to the first set of one or more propulsion systems. For example, once the second set of one or more propulsion systems have generated a predetermined velocity so that the wings provide enough lift to maintain altitude, the first set of one or more propulsion systems may no longer be needed for vertical lift. Accordingly, one or more of the first set of one or more propulsion systems can be powered down, deactivated, placed in a standby mode, or be operated at a reduced power level during forward flight of the aircraft.

The control system may continue alternating between operating one or more of the first set of one or more propulsion systems and/or the second set of one or more propulsion systems based on flight instructions and flight activities, such as hovering or landing.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus.

Additionally, spatially relative terms, such as "front or "back" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface can then be oriented "back" from other elements or features. The device can be otherwise oriented (e.g., rotated 90 degrees or at other orientations) and the spatially relative descriptors used herein interpreted accordingly.

While the invention has been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. An aircraft comprising:
    a fuselage;
    a pair of wings coupled to opposite sides of the fuselage;
    a propulsion system coupled to a first wing of the pair of wings, wherein the propulsion system comprises:
        a spinner;
        a first rotor blade including a first blade portion and a first root portion, the first rotor blade configured to move between a first pitch position and a second pitch position, wherein the second pitch position is higher than the first pitch position;
        a first strake coupled to the spinner and positioned adjacent to and downstream of the first root portion of the first rotor blade, wherein the first strake is fixed and seamlessly aligned with the first rotor blade when the first rotor blade is in the second pitch position;
        a second rotor blade, the second rotor blade including a second blade portion and a second root portion, the second rotor blade configured to move between a third pitch position and a fourth pitch position;
        a second strake coupled to the spinner and positioned adjacent to and downstream of the second root portion of the second rotor blade, wherein the second strake is fixed and seamlessly aligned with the second rotor blade when the second rotor blade is in the fourth pitch position;
        a third strake coupled to the spinner and positioned adjacent to and upstream of the first root portion of the first rotor blade, wherein the third strake is fixed and seamlessly aligned with the first rotor blade when the first rotor blade is in the second pitch position; and
        a fourth strake coupled to the spinner and positioned adjacent to and upstream of the second root portion of the second rotor blade, wherein the second strake is fixed and seamlessly aligned with the second rotor blade when the second rotor blade is in the fourth pitch position.

2. The aircraft of claim 1, further comprising:
    a control system configured to:
        operate the propulsion system to generate forward thrust;
        determine that the aircraft has reached a predefined forward velocity; and
        in response to determining that the aircraft has reached the predefined forward velocity, operate a pitching mechanism to move the first rotor blade into alignment with the first strake, wherein the first rotor blade and the second rotor blade are set to the second pitch position and the fourth pitch position respectively during forward cruising flight above the predefined forward velocity, such that the first strake is aligned with the first rotor blade and the second strake is aligned with the second rotor blade during the forward cruising flight above the predefined forward velocity.

3. The aircraft of claim 2, wherein the propulsion system includes a tiltable propulsion system configured to move between a forward flight configuration and a vertical flight configuration, and the control system is further configured to set the propulsion system to the forward flight configuration before the aircraft has reached the predefined forward velocity.

4. The aircraft of claim 1, wherein the first strake is configured to modify airflow over the first rotor blade when aligned with the first rotor blade.

5. The aircraft of claim 1, wherein the propulsion system further includes:
    one or more cooling fins coupled to the spinner and positioned downstream from the first rotor blade, the second rotor blade, the first strake, and the second strake.

6. The aircraft of claim 1, wherein the first strake and a proximate end of the first blade portion are separated by a gap.

7. The aircraft of claim 1, wherein the first strake includes one or more curved surfaces.

8. The aircraft of claim 1, wherein the first strake includes a surface that conforms to a shape of the first root portion.

9. The aircraft of claim 1, wherein the first pitch position is the same as the third pitch position, and the second pitch position is the same as the fourth pitch position.

10. The aircraft of claim 1, wherein the first rotor blade and the second rotor blade are set to the first pitch position and the third pitch position respectively during a time of aircraft acceleration, the first strake is not aligned with the first rotor blade when the first rotor blade is in the first pitch position, and the second strake is not aligned with the second rotor blade when the second rotor blade is in the third pitch position.

11. The aircraft of claim 1, wherein the first strake has a same width as an adjacent portion of the first rotor blade.

12. The aircraft of claim 1, wherein the first strake is shaped to follow a curvature of a surface of the first root portion of the first rotor blade in a direction extending outward from the spinner.

13. The aircraft of claim 1, wherein the first pitch position is between about 15 degrees and about 25 degrees, and the second pitch position is between about 30 degrees and about 50 degrees.

14. The aircraft of claim 1, wherein the first strake is angled relative to a forward direction of the spinner.

15. The aircraft of claim 1, wherein the first strake has a fixed pitch position between 30 degrees and 50 degrees.

16. A propulsion system comprising:
a spinner;
a plurality of rotor blades, each including a blade portion and a root portion, and each configured to move between a first pitch position and a second pitch position, wherein the second pitch position is higher than the first pitch position; and
a plurality of first strakes, each coupled to the spinner and positioned adjacent to and downstream of a respective root portion of a respective rotor blade of the plurality of rotor blades, each having a first fixed pitch position, and each being seamlessly aligned with the respective rotor blade when the respective rotor blade is in the second pitch position, and
a plurality of second strakes, each coupled to the spinner and positioned adjacent to and upstream of the respective root portion of the respective rotor blade of the plurality of rotor blades, each having a second fixed pitch position, and each being seamlessly aligned with the respective rotor blade when the respective rotor blade is in the second pitch position.

17. The propulsion system of claim 16, wherein each of the plurality of first strakes includes a surface that conforms to a shape of the respective root portion.

18. The propulsion system of claim 16, wherein the first pitch position is between about 15 degrees and about 25 degrees, and the second pitch position is between about 30 degrees and about 50 degrees.

19. The propulsion system of claim 16, wherein each of the plurality of first strakes is angled relative to a forward direction of the spinner.

20. The propulsion system of claim 16, wherein the first fixed pitch position is between 30 degrees and 50 degrees.

* * * * *